United States Patent
Garcia et al.

(10) Patent No.: US 12,221,039 B2
(45) Date of Patent: Feb. 11, 2025

(54) CAMERA ASSEMBLY FOR MOTOR VEHICLES AND METHOD FOR ASSEMBLING IT

(71) Applicant: FICOSA ADAS, S.L.U., Barcelona (ES)

(72) Inventors: Daniel Abad Garcia, Barcelona (ES); Ariadna Soto, Barcelona (ES)

(73) Assignee: FICOSA ADAS, S.L.U., Barcelona (ES)

(*) Notice: Subject to any disclaimer, the term of this patent is extended or adjusted under 35 U.S.C. 154(b) by 0 days.

(21) Appl. No.: 17/198,778

(22) Filed: Mar. 11, 2021

(65) Prior Publication Data

US 2021/0284081 A1 Sep. 16, 2021

(30) Foreign Application Priority Data

Mar. 11, 2020 (EP) ..................................... 20382176

(51) Int. Cl.
| | |
|---|---|
| *H04N 23/52* | (2023.01) |
| *B60R 11/04* | (2006.01) |
| *H04N 23/51* | (2023.01) |
| *H04N 23/57* | (2023.01) |

(52) U.S. Cl.
CPC .............. *B60R 11/04* (2013.01); *H04N 23/51* (2023.01); *H04N 23/57* (2023.01)

(58) Field of Classification Search
CPC ................ G06T 7/0004; H04N 5/2252; H04N 5/22521; H04N 5/2253; H04N 5/2257; B60R 11/04
See application file for complete search history.

(56) References Cited

U.S. PATENT DOCUMENTS

| | | | | |
|---|---|---|---|---|
| 7,848,640 | B2* | 12/2010 | Hasegawa ............... | G03B 17/02 396/541 |
| 2002/0051073 | A1* | 5/2002 | Paavola .................. | H04N 9/097 348/373 |
| 2008/0280466 | A1* | 11/2008 | Sitz ....................... | H05K 5/0278 439/131 |

(Continued)

FOREIGN PATENT DOCUMENTS

| | | |
|---|---|---|
| DE | 102005028144 A1 | 12/2006 |
| WO | WO-2006136208 A1 * 12/2006 | ........... H04N 5/2251 |

(Continued)

OTHER PUBLICATIONS

European Search Report for European Application No. 20382176.4, dated Aug. 17, 2020, 8 pgs.

*Primary Examiner* — Patrick E Demosky
(74) *Attorney, Agent, or Firm* — Brooks Kushman P.C.

(57) ABSTRACT

A camera assembly for motor vehicles comprises a housing with at least one opening for receiving a connector-adapter, an image sensor connected to an electronics carrier provided within the housing, and an insulating member within the housing defining at least a first and second chamber. The electronics carrier is intersected by the insulating member preventing matter from passing from the first chamber to the second chamber. The assembling method comprises deposition of insulating material within the housing to form an insulating member and fitting of the electronics carrier within the housing such that the electronics carrier is intersected by the insulating member.

16 Claims, 9 Drawing Sheets

(56) References Cited

U.S. PATENT DOCUMENTS

| | | |
|---|---|---|
| 2012/0019940 A1 | 1/2012 | Lu et al. |
| 2016/0191863 A1 | 6/2016 | Minikey, Jr. et al. |
| 2018/0338070 A1 | 11/2018 | Sigle |
| 2020/0098663 A1* | 3/2020 | Sugiyama ............... C08L 93/00 |
| 2021/0021747 A1* | 1/2021 | Brzobohaty .......... G06T 7/0004 |

FOREIGN PATENT DOCUMENTS

| | | |
|---|---|---|
| WO | 2018079300 A1 | 5/2018 |
| WO | 2019179545 A1 | 9/2019 |

\* cited by examiner

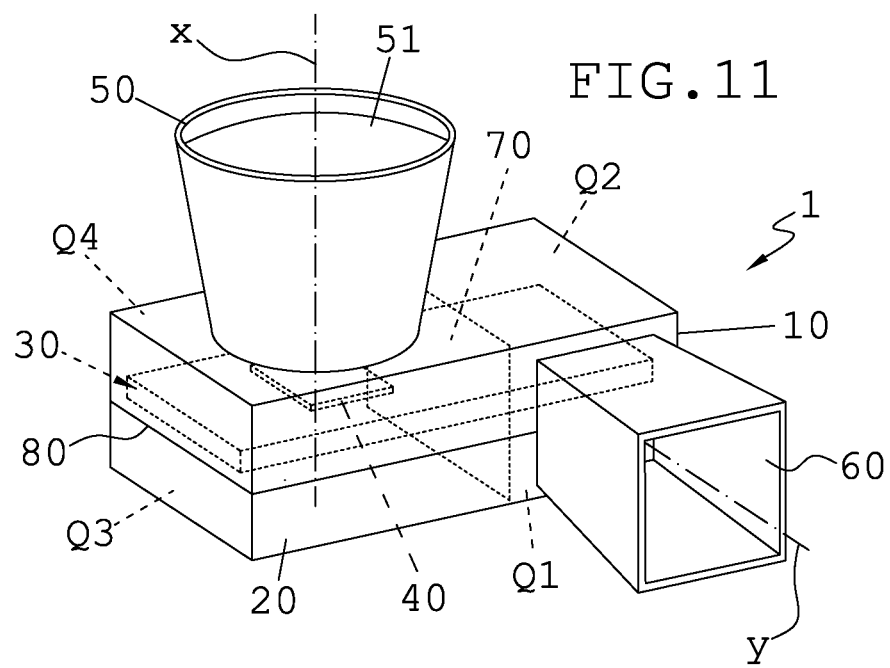
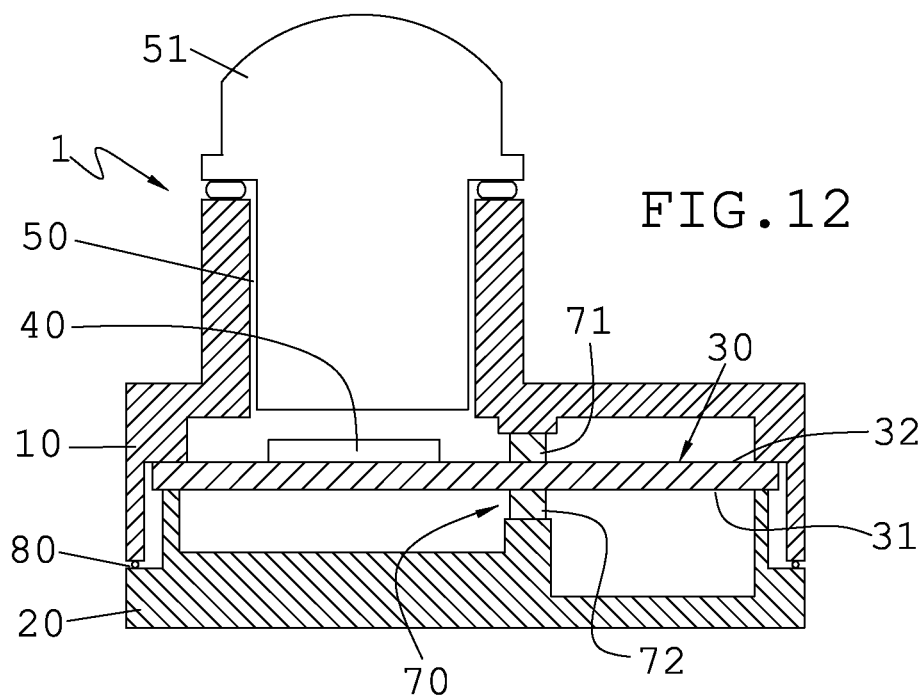

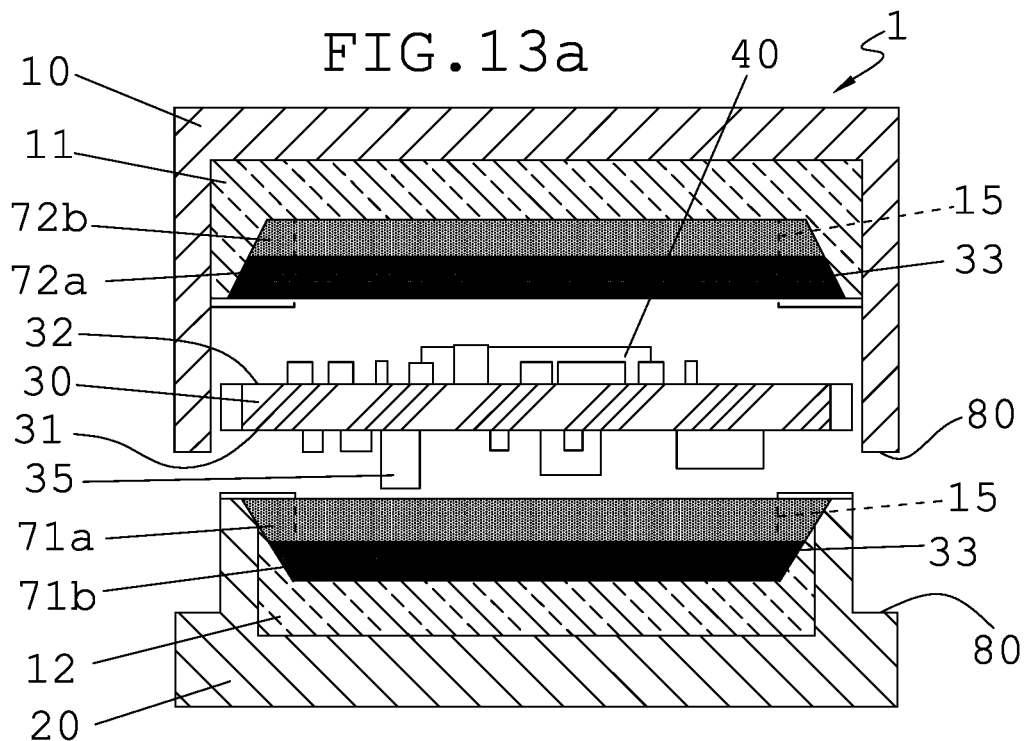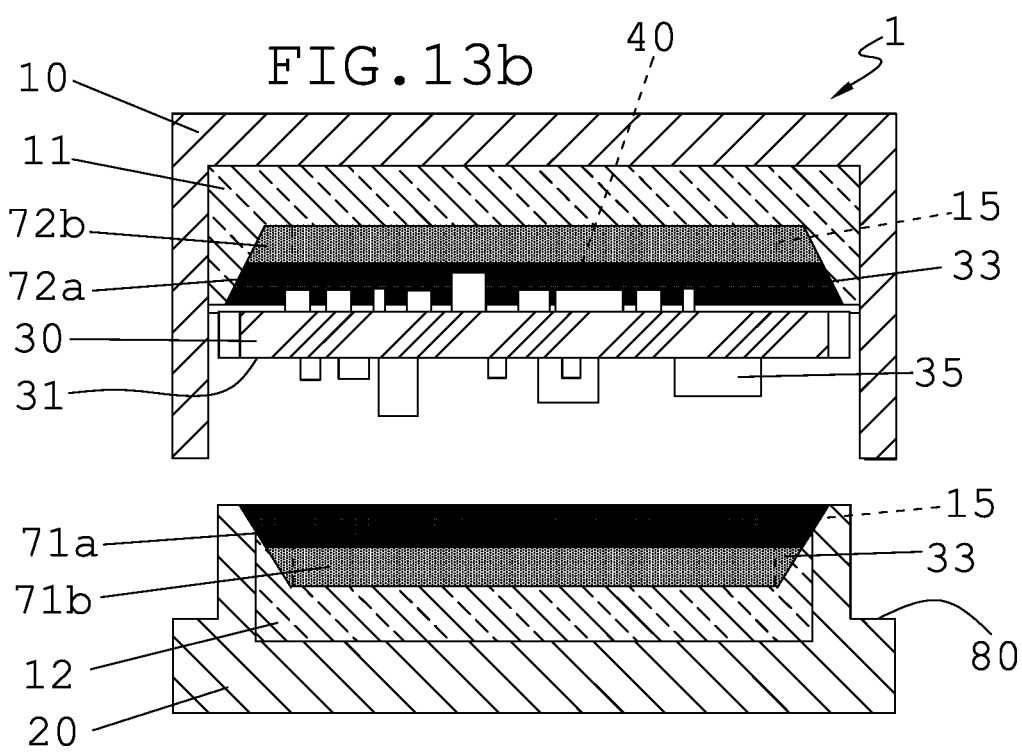

CAMERA ASSEMBLY FOR MOTOR VEHICLES AND METHOD FOR ASSEMBLING IT

CROSS-REFERENCE TO RELATED APPLICATIONS

This application claims priority to EP application Serial No. 20382176.4 filed Mar. 11, 2020, the disclosure of which is hereby incorporated in its entirety by reference herein.

TECHNICAL FIELD

This disclosure relates to a camera assembly for motor vehicles with improved sealing against dust and dirt. A method is also disclosed for assembling such camera assembly.

BACKGROUND

Vehicle cameras typically include a housing inside of which an electronics carrier such as a printed circuit board (PCB) is provided. An image sensor or imager is connected to the electronics carrier. The image sensor is in turn in optical communication with a lens or lens assembly that is coupled to the camera housing. Light from the exterior is guided by the lens or lens assembly towards the image sensor or imager. The image that is captured by the image sensor is displayed on a display through a connector-adapter or electrical connector such as a Fachkreis Automobil (FAKRA) standard, automotive-grade connector. It is thus highly important that dust and dirt do not reach the image sensor. For example, cameras in motor vehicles, for example, parking cameras, typically include a housing assembly suitable for housing electronics components therein such as electronics carrier, camera lens, image sensor, and so on. The housing assembly generally comprises a first housing part also referred to as front housing and a second housing part also referred to as back housing. Until only some years ago, both housing parts in prior art camera housing assemblies have been generally made of plastics. The first housing part and the second housing part are attached together by ultrasonic welding.

Camera housings typically have a first opening for receiving the lens or lens assembly and a second opening for receiving the electrical connector. The first opening is typically sealed since by the lens or lens assembly being glued or screwed to the housing in a way that dust and dirt are prevented from entering the housing and contacting the image sensor. As to the second opening, in many cases it is positioned such that there is little room for fitting a sealing mechanism such as a rubber gasket or sealing cord. Also, sealing operation becomes awkward when the second opening is square shaped. This adds complexity and manufacturing costs while it cannot be ensured that dust and dirt do not enter the housing and reach the image sensor.

US2012019940 discloses a vehicle camera including a housing, a lens, and a lens barrel holding optical components therein. An image sensor is mounted on a printed circuit board (PCB) that is in turn mounted in the housing and positioned for receiving video input from the lens. The camera is configured to transmit to at least one other vehicular device signals relating to the video input received by the image sensor. The image sensor is protected from dust and dirt by a UV cured glue provided between the PCB and the housing.

WO2018079300 discloses an imaging device that comprises a housing, an imaging unit fixed thereto by a curable resin including a curable adhesive. An image sensor is connected to a printed circuit board (PCB) which is mounted on the housing. The PCB is attached to a lens barrel. The housing is attached to an imaging unit-side mounting portion. Curable resin is provided in the holes where the screws are provided.

Although the electrical components in the electronics carrier may not be affected by dust and dirt entering from the outside and can still operate, the image sensor may be greatly affected to the extent that the images displayed by a camera are not clear and displayed in a blurred manner. This is aggravated in the case of metallic powder, as it is electrically conductive and could damage electronic components and even short-circuit the assembly. Image sensor isolation has not yet been fully resolved so a camera assembly for motor vehicles is required with enhanced sealing of the image sensor through a cost-effective sealing mechanism.

SUMMARY

The present disclosure provides a camera assembly for motor vehicles whose configuration has been found to be cost-effective and highly efficient in sealing and protecting the imager or image sensor within the housing from foreign matter.

The camera assembly that is herein disclosed comprises a housing having at least one opening for receiving a connector-adapter. The connector-adapter may be any standard automotive-grade connector of such as the above mentioned FAKRA electrical connector. The opening in the housing may be preferably configured for receiving the connector-adapter or electrical connector in a way that a longitudinal axis of the connector-adapter is substantially perpendicular to an optical axis of a lens assembly. It may be preferred that a longitudinal axis of the connector-adapter is perpendicular to an optical axis of a lens assembly. However other relative orientations of connector-adapter longitudinal axis and lens assembly optical axis are possible.

The housing of the camera assembly may be a one-piece housing, but the housing of the camera assembly may preferably comprise at least a first housing part, or front housing, and a second housing part, or back housing, which together define an interior when attached to one another. The interior of the housing, either it is formed of one more parts, is suitable for including therein an electronics carrier such as, for example, a printed circuit board (PCB), and an image sensor or imager connected to the electronics carrier. The above mentioned lens assembly is in optical communication with the image sensor for capturing an image. The lens assembly may be partly inserted into the housing or one of the housing parts.

An insulating member is positioned within the housing. The insulating member may for example be a paste-like element. Other configurations may however be possible. The insulating member is preferably fitted within the housing, arranged to contact inner walls of the housing and the electronics carrier.

The insulating member is configured to define at least a first chamber and a second chamber within the housing. There is no constraint as to the relative size of volume of the chambers defined within the housing by the insulating member. The insulating member is arranged such that the electronics carrier is intersected by the insulating member. However, the electronics carrier and the insulating member are in electrical contact with each other, that is, electrical components in the electronics carrier received within the first chamber are in electrical contact with electrical components in the electronics carrier received within the second chamber. In other words, the insulating member does not interrupt the electrical connection between the electrical components in the electronics carrier. Such electrical contact may be either direct or indirect, that is, with other elements therebetween allowing the current to flow through. The connector-adapter is thus always electrically connected to the image sensor.

The electronics carrier with its electrical components thus pass through the insulating member within the housing. It is preferred that the insulating member fits, surrounds and wraps a cross sectional portion of the electronics carrier and its components leaving no gaps between the insulating member and the electronics carrier and its components.

In one preferred but non limiting example, the insulating member may be arranged perpendicular to the electronics carrier. Other relative angular positions of the insulating member and the electronics carrier are possible as long as the insulating member and the electronics carrier at least four areas or quadrants are defined within the housing.

The electronics carrier has first and second main surfaces at least one of which is preferably flat. At least one portion of the first surface of the electronics carrier is located within the first chamber while at least another, different portion of the first surface of the electronics carrier is located within the second chamber. Both portions of the electronics carrier comprise electronic components electrically connected to each other. A stated above, the electronics carrier and the insulating member are in electrical contact with each other so that the insulating member does not interrupt the electrical connection between the electronic components of the electronics carrier.

In one example, at least one portion of the second surface of the electronics carrier is located within the first chamber while at least another, different portion of the second surface of the electronics carrier is located within the second chamber. Thus, as stated above, the at least four areas or quadrants are defined within the housing by the relative positioning of the electronics carrier and the insulating member. According to aspects noted above, the portions of the electronics carriers are in electrical connection with the insulating member.

Although the insulating member may be made of a waterproofing material, liquids are not expected to be found within the camera assembly. However, dirt and dust, preferably suspended in air, may enter in the camera assembly through the opening for receiving the connector-adapter. In particular, through the gap between the edge of the opening for receiving the connector-adapter and the connector-adapter. As a result of the above configuration with an appropriate fitting of the insulating member to the geometry of the electronics carrier and its electronic components, dirt, dust are prevented from passing inside the housing where the image sensor is mounted, and more specifically, dirt, dust and other foreign matter are efficiently prevented from passing through the insulating member from the first chamber to the second chamber within the housing so foreign matter is prevented from reaching and come into contact with the image sensor when the image sensor is in the second chamber within the housing.

A camera assembly with highly efficient sealing is provided due to the particular arrangement of the insulating member within the housing. The term sealing refers herein to a sealing device which provides a tight and/or hermetic closure, preventing the passage of different materials such as dirt, dust, water, gas, air, etc. and in general foreign matter through a closure.

With a camera assembly having the above described configuration, dust and/or dirt is/are prevented from reaching and coming into contact with the image sensor, even if dust and/or dirt is/are already present within the camera housing.

In cases where the housing comprises a first housing part and a second housing part, the insulating member may comprise at least a first layer to be placed in the first housing part and a second layer to be placed in the second housing part. In this case, the electronics carrier, in use, is sandwiched or otherwise inserted or interposed between the first layer and the second layer of the insulating member. In other words, the electronics carrier traverses, in use, the insulating member. The insulating member is preferably made of a material such that the first layer and the second layer are deformed under pressure when inserted in the first and second housing parts.

In the above specific example where the insulating member comprises first and second layers, a distance between oppositely facing surfaces of the first layer and the second layer of the insulating member is equal to or less than a thickness of the electronics carrier.

At least one protrusion may be provided in the first and second housing parts adapted to receive the material of the insulating member. Such at least one protrusion is arranged extending at least substantially perpendicular to the main surfaces of the electronics carrier to support the insulating member. The protrusion may have at least one inclined portion, for example, an end portion, intended to abut inner walls of the housing. In one example, at least one protrusion may have at least one 60°-30° chamfered end such as for example a 45° chamfered end. Protrusions provide stability to the insulating member which allows the first layer and the second layer of the insulating member to be deformed such as to surround and wrap crosswise the PCB and the electronic components, leaving no gaps, in particular, between the PCB and the inner walls of the housing. This also allows an efficient deposition of the insulating member material on the inner walls of the housing. The chamfered end is suitable for a robot to apply paste-like insulating material from a source reservoir through 0.5 mm-5 mm diameter supply needles in the robot onto the protrusion that is formed in front housing. The paste-like insulating material is applied in cords or droplets whose size substantially corresponds to the diameter of the robot supply needles. As a result, the height and the thickness of the first layer and the second layer of the insulating member is of the order of 0.5 mm-5 mm such as for example 3 mm. This size is suitable to allow deformation of the first layer and the second layer in order to prevent gaps from being formed through the insulating member. Where components in the electronics carrier are higher than 0.5 mm-5 mm, greater cords or droplets would be required to be supplied. This may be performed by applying insulating material in several passes for each layer.

The insulating member is preferred to be made of a thermally conductive material such as a commercially available gap filler. More specifically the insulating member is preferred to be made of a non-electrically conductive material having a thermal conductivity of, for example, 1-15 W/mK, more preferably 3-5 W/mK. A preferred thermally conductive material is one that dissipates heat generated by the electronics components in the electronics carrier at least 10 times faster than air, preferably 40 times faster than air. In addition, stable properties at temperatures ranging from −40 C.° to 150 C.° for the material of the insulating member are also preferred. Hardness and strength of the material from which the insulating member is made are not degraded over time.

The present disclosure also refers to a method for assembling the above described camera assembly. The method comprises depositing, for example, through a suitable robot, insulating material such as a commercially available non-electrically conductive paste-like gap filler. The insulating material is applied in one or more passes, depending on the thickness and the layers desired for the insulating member. When the housing comprises a first housing part and a second housing part, i.e., when a two-piece housing is provided, one pass is applied to the first housing part defining a first layer of insulating member and another pass is applied to the second housing part defining a second layer of insulating member.

The electronics carrier is then fitted in the first housing part and attached to the first housing part via screws, for example, such that the insulating member is intersected by the electronics carrier. Other attaching mechanisms are possible. The second housing part is then aligned with (the image sensor should be permanently aligned with the lens assembly). A rubber gasket or other suitable sealing mechanism is fitted between the first housing part and second housing part and both housing parts are attached together, for example, via screws. In this condition, the first layer of the insulating member in the first housing part and the second layer of the insulating member in the second housing part define an insulating member which in turn divides the interior of the housing into a first chamber and a second chamber.

The opening for receiving the lens assembly and the interface between the first housing part and the second housing part (when a two-piece housing is provided) are sealed by glue or other suitable sealing mechanism which, together with the opening for receiving the connector-adapter which is sealed with the insulating member, results in foreign matter such as dust and dirt being efficiently blocked from contacting the image sensor. The image sensor is efficiently protected from damages and at least image quality is not compromised due to foreign matter such as dust and dirt. This is accomplished by a camera assembly whose manufacturing process is improved and cost effective since a simple configuration is obtained where space is maximized.

BRIEF DESCRIPTION OF THE DRAWINGS

A non-limiting example of the present vehicle camera assembly will be described in the following, with reference to the appended drawings, in which:

FIG. 11 is a perspective view of the camera assembly;

FIG. 12 is a sectional view of the camera assembly taken along line E-E in FIG. 7;

FIG. 13a is a diagrammatic sectional view of the front and back housings taken along line D-D in FIG. 7 in a disassembled condition;

FIG. 13b is a diagrammatic sectional view of the front and back housings taken along line D-D in FIG. 7 in a partially assembled condition.

DETAILED DESCRIPTION

According to the drawings in figures, a non-limiting example of a camera assembly 1 for motor vehicles is shown. In the example shown, the camera assembly 1 corresponds to a rear-view camera although many other different applications are possible.

Figure 2:
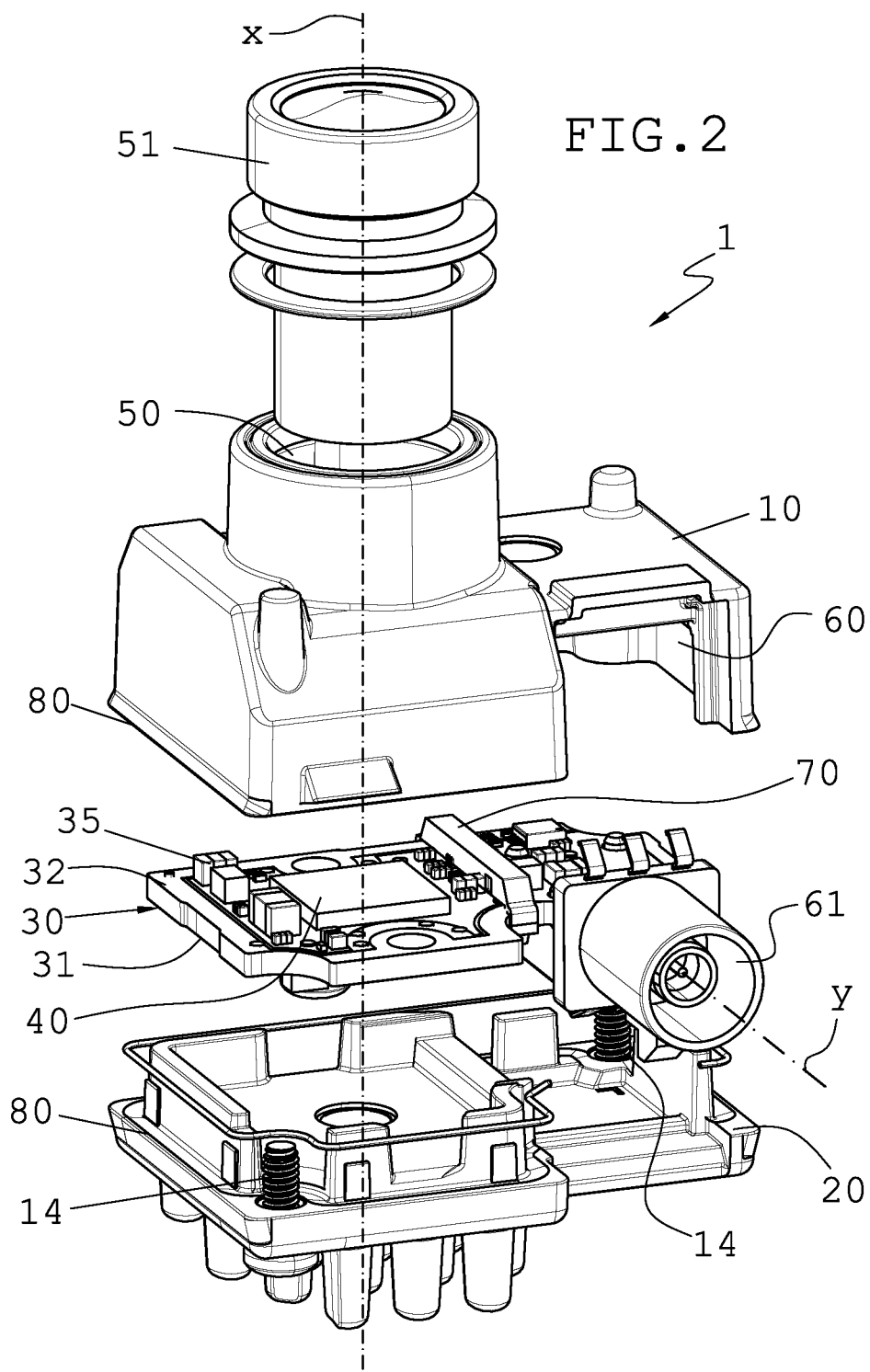
FIG. 2 is an exploded perspective view of the camera assembly.
Figure 3:
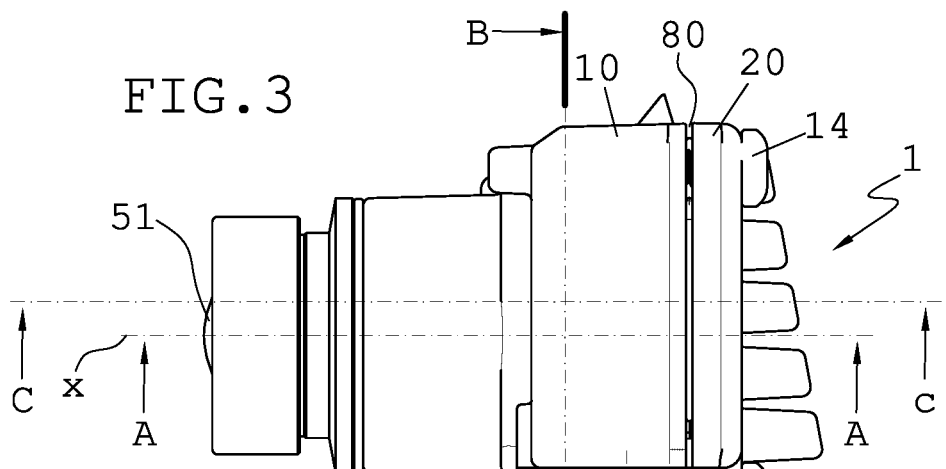
FIG. 3 is a side elevational view of the camera assembly.
Figure 4:
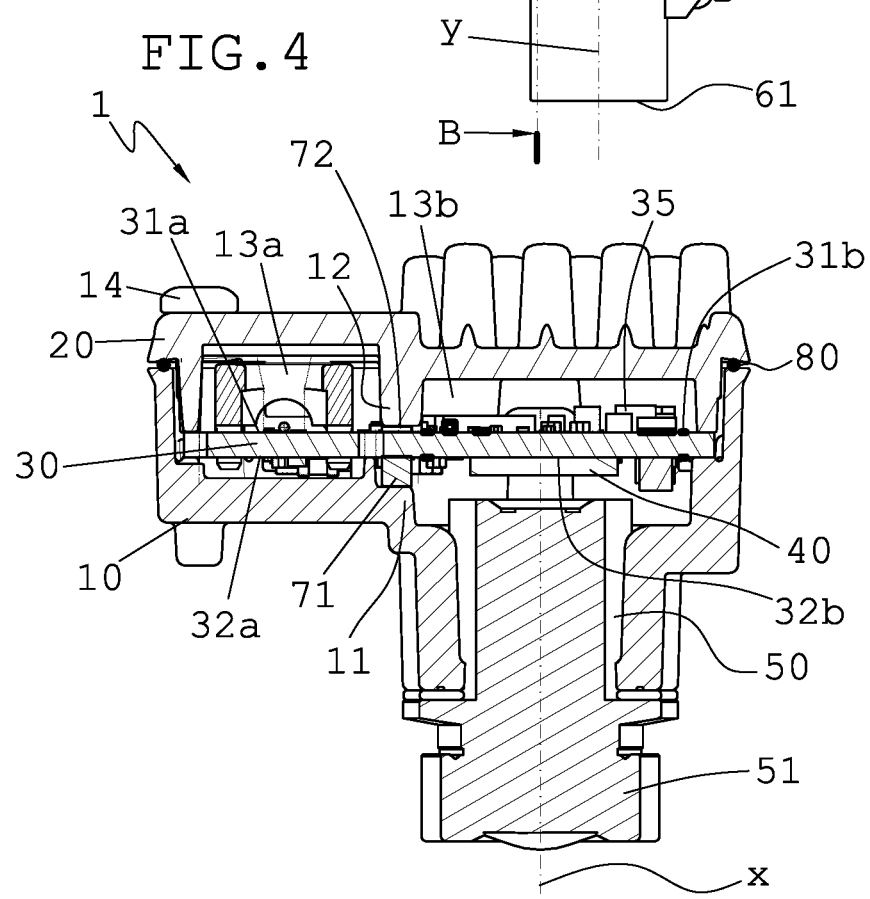
FIG. 4 is a sectional view of the camera assembly taken along line C-C in FIG. 3.
Figure 5:
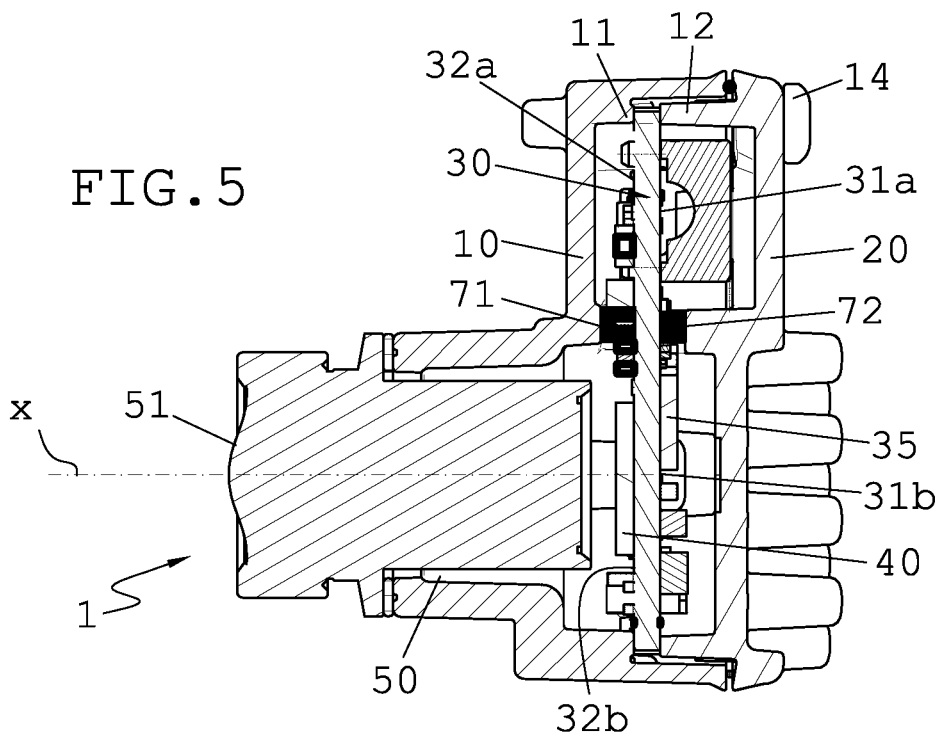
FIG. 5 is sectional view of the camera assembly taken along line A-A in FIG. 3.
Figure 6:
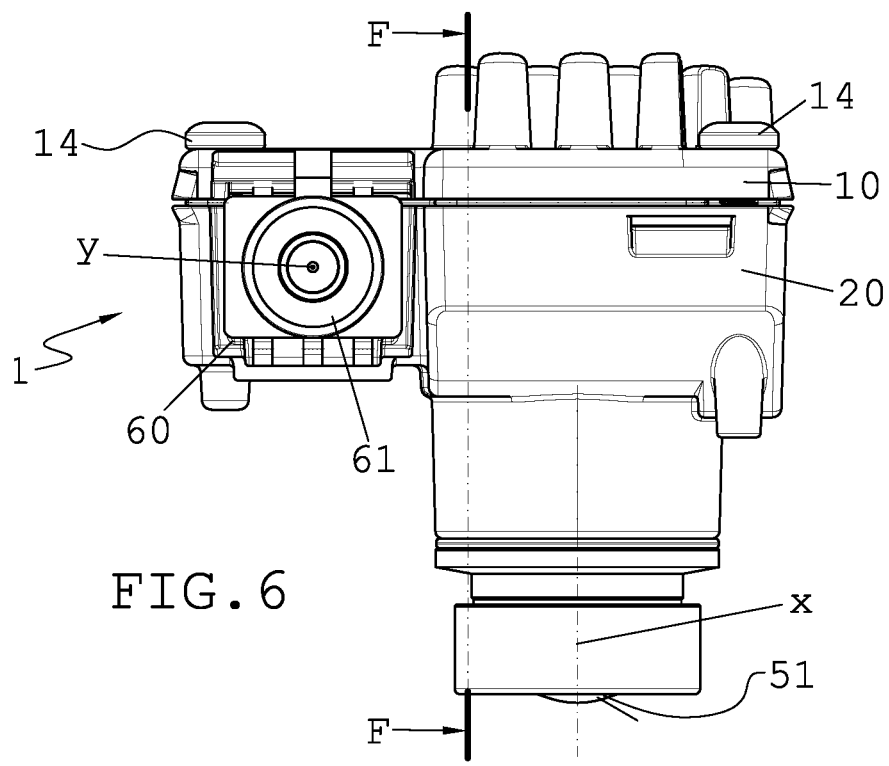
FIG. 6 is a bottom view the camera assembly.

The camera assembly 1 comprises a housing that is formed by a first housing part, or front housing 10, and a second housing part, or back housing 20. In use, the front housing 10 and the back housing 20 are attached together via screws 14 as shown in FIG. 2. An interior is defined within the front housing 10 and the back housing 20 when attached to each other. A suitable rubber gasket is provided in an interface 80 between the front housing 10 and the back housing 20.

The front housing 10 has a first opening 50 for receiving a lens assembly 51 as shown in the figures. The lens assembly 51 in the example shown is partly inserted into the front housing 10. As illustrated, an optical axis x is defined by the lens assembly 51. As it will be described further below, the first opening 50 is configured such that the lens assembly 51 is positioned in optical alignment with an image sensor or imager 40. On the other hand, a second opening 60 is provided for receiving a connector-adapter 61 such as of the Fachkreis Automobil (FAKRA) type, that is known in the field. A longitudinal axis y is defined by the connector-adapter 61. The second opening 60 is configured for receiving the connector-adapter 61 such that its longitudinal axis y is substantially perpendicular to the optical axis x of the lens assembly 51. In one preferred example, the longitudinal axis y of the connector-adapter 61 is perpendicular to the drawing sheet of FIG. 1, and thus also perpendicular to the optical axis x of the lens assembly 51.

An electronics carrier 30 is mounted in the interior defined within the front housing 10 and the back housing 20. In this example, the electronics carrier is a printed circuit board (PCB) 30. The PCB 30 carries electrical components 35 including the above mentioned image sensor 40 such that it is in optical communication with the lens assembly 51 for capturing an image from the exterior of the vehicle that is displayed in a display via the above connector-adapter 61.

An insulating member 70 is provided. In the example shown, the insulating member 70 comprises a first layer 71 of insulating material and a second layer 72 of insulating material. The material from which the first layer 71 and the second layer 72 is made may be the same or different and may be for example a thermally conductive material such as a commercially available non-electrically conductive gap filler having a thermal conductivity of 1-15 W/mK that dissipates heat generated by the electronics components 35 in the PCB 30 at least 10 times faster than air, preferably 40 times faster than air, having stable properties at temperatures ranging from −20 C.° to 150 C.°.

Figure 1:
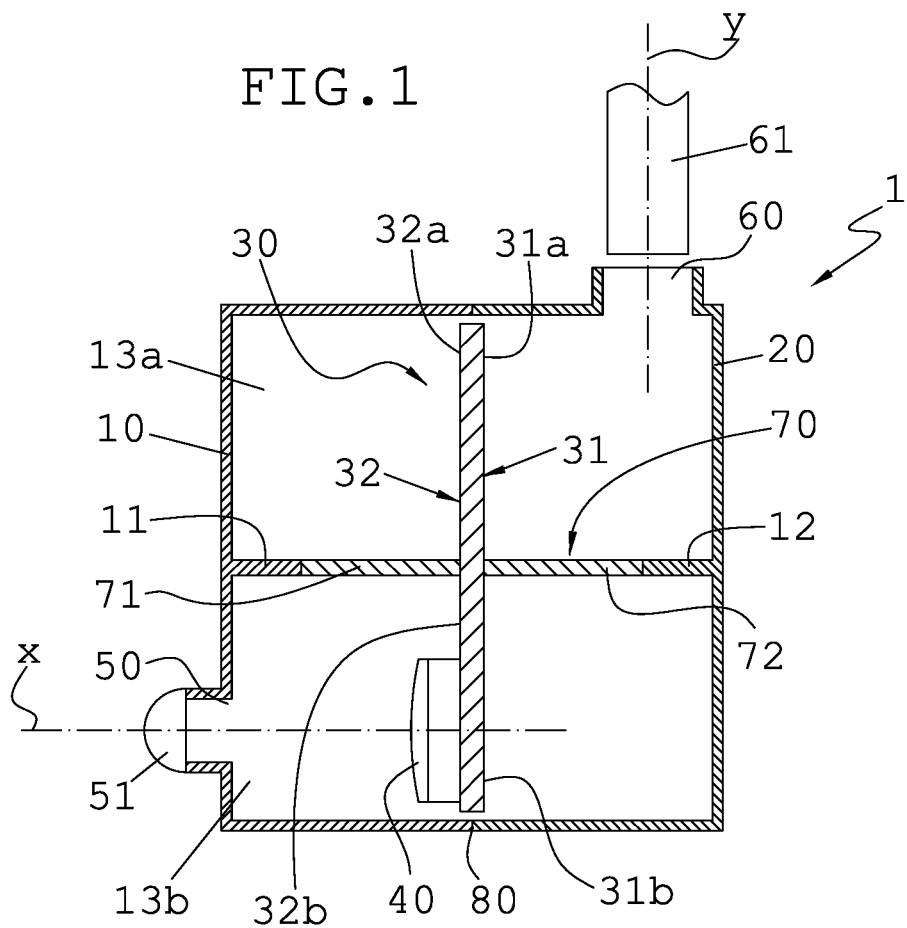
FIG. 1 is a sectional view of one example of the present camera assembly for motor vehicles.

The PCB 30 has a first main flat surface 32 and an opposite second main flat surface 31 as depicted in FIG. 1. A distance L between oppositely facing surfaces of the first layer 71 and the second layer 72 of the insulating member 70 is equal to or less than a thickness t of the electronics carrier 30. In particular, it is advantageous that once the front and back housing 10, 20 are attached together the first layer 71 is in contact to the second layer 72 of the insulating member 70. Therefore, in use, the first and second layers 71, 72 form a barrier that surrounds and wraps crosswise the PCB 30 and the electronic components 35.

The insulating member 70 is positioned inside the front and back housing parts 10, 20 such that a first chamber 13a and a second chamber 13b are defined therein. The image sensor 40 is attached to the first main surface 32 of the PCB 30. The image sensor 40 is thus in the second chamber 13b. Due to the nature of the insulating member 70, the chambers 13a, 13b are effectively isolated such that dirt, dust and other foreign matter are prevented from passing through the insulating member 70 from the first chamber 13a to the second chamber 13b and thus from reaching the image sensor 40.

The insulating member 70 is arranged surrounding and wrapping crosswise the PCB 30 and the electrical components 35 therein leaving no gaps there between. This allows space within of the camera assembly 1 to be advantageously optimized so more components can be fitted in the PCB 30.

In the example shown, the PCB 30 is provided passing through the insulating member 70 such that the PCB 30 and the insulating member 70 are arranged perpendicular to each other. With the insulating member 70 fitted to abut inner walls of the front and back housing parts 10, 20 and also the PCB 30 and its electrical components 35 sealing them results in dirt, dust and other foreign matter being prevented from reaching the image sensor 40 that is arranged in the second chamber 13b.

Figure 7:
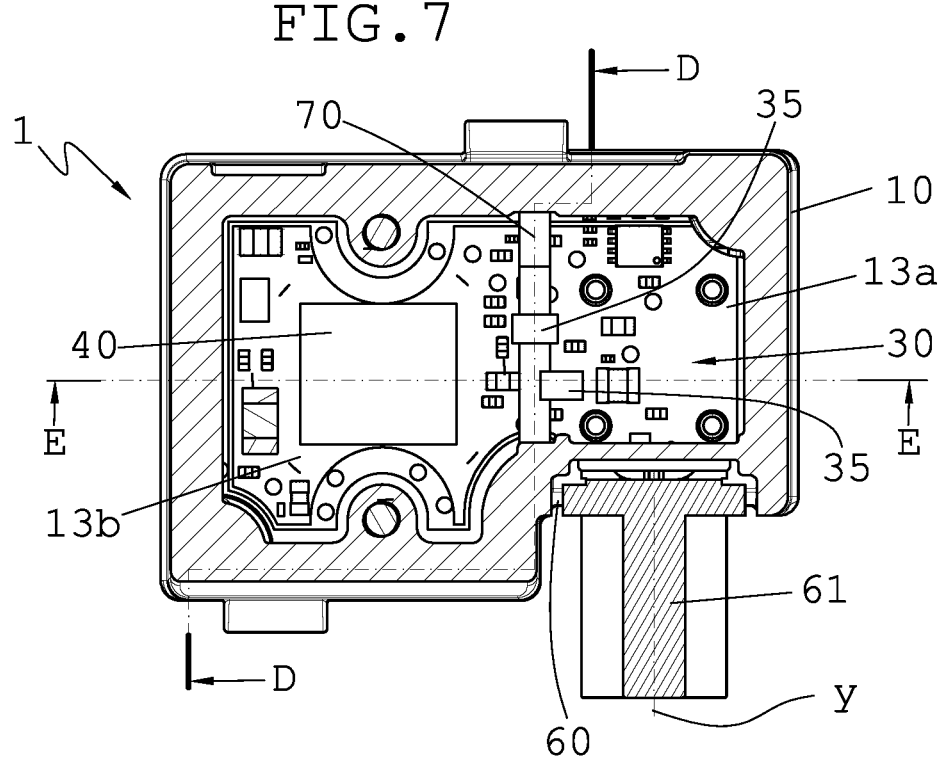
FIG. 7 is a sectional view of the camera assembly taken along line B-B in FIG. 3.
Figure 9:
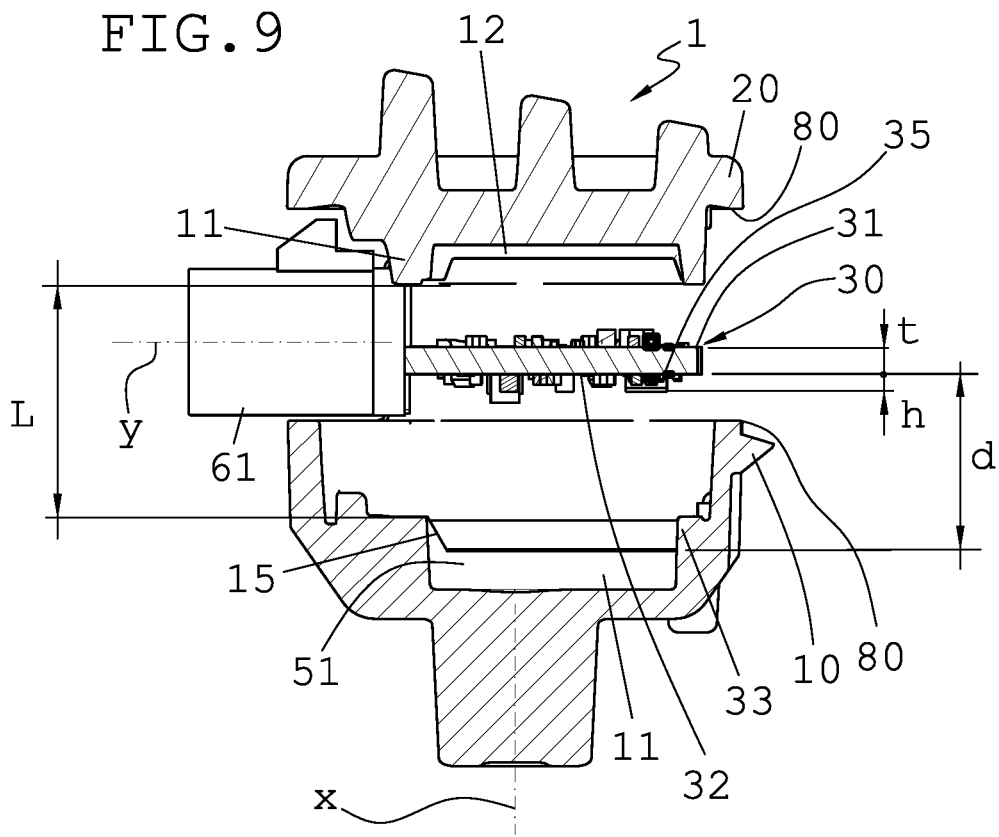
FIG. 9 is a sectional view of the camera assembly along line F-F in FIG. 6.

In the example shown in FIG. 7, a portion of an electronic component 35 is located in the first chamber 13a and another portion of the electronic component 35 is located in the second chamber 13b. Further, an intermediate part of the electronic component 35 is encapsulated between the insulating member 70 and the PCB 30. As the insulating member 70 is made of a paste-like of thermally conductive material, said insulating member 70 is adapted to dissipate the heat generated by the electronic component 35. As shown in FIG. 9, a height h of the electronic component 35 is lower than a distance d between the first main flat surface 32 and the protrusion 11. It is advantageous that the height h of the component 35 is less than 90% of the distance d between the first main flat surface 32 and the protrusion 11. According to a non-limiting example, the height h of the component 35 is less than 60% of the distance d between the first main flat surface 32 and the protrusion 11. Further, in the case that said electronic component 35 is arranged on the second main surface 31, its height h is lower than the distance d between the second main flat surface 31 and the protrusion 12.

With the above configuration and due to the relative positioning of the PCB 30 and the insulating member 70, the PCB 30 and the insulating member 70 are divided into two areas defining four quadrants Q1, Q2, Q3, Q4 within the front and back housing parts 10, 20 as shown in FIG. 11. Quadrant Q1 is located within the first chamber 13a and is defined by the first main flat surface 32 of the PCB 30 and the second layer 72 of the insulating member 70. Quadrant Q1 comprises the second opening 60 for the connector-adapter 61. The second opening 60 is located in the first chamber 13a, either in the first quadrant Q1 or in the second quadrant Q2. In a preferred example, the second opening 60 is arranged in both quadrants Q1, Q2. The adapter 61 may be electrically connected to at least one of the first main flat surface 32a of the first chamber 13a or to the second main flat surface 31a of the first chamber 13a. Quadrant Q2 is also located within the first chamber 13a and is defined by the second main flat surface 31 of the PCB 30 and the first layer 71 of the insulating member 70. Dust and dirt can enter the first chamber 13a even though although the electrical components 35 of the PCB 30 in the first chamber 13a are typically adapted to work under conditions with some dirt and dust. Quadrant Q3 is located within second chamber 13b and is defined by the first main flat surface 32 of the PCB 30 and the second layer 72 of the insulating member 70. Quadrant Q4 is also located within the second chamber 13b and is defined by the second main flat surface 31 of the PCB 30 and the first layer 71 of the insulating member 70. Quadrant Q4 includes the image sensor 40 having the optical connection with the lens assembly 51. Dust and dirt cannot enter the second chamber 13b and thus cannot reach the image sensor 40.

As seen from FIG. 1, the first and second main flat surfaces 32, 31 of the PCB 30 are each divided in corresponding first areas 32a, 31a and corresponding second areas 32b, 31b, respectively, according to quadrants Q1, Q2, Q3, Q4. More specifically, a first area 31a of the PCB second main surface 31 is defined within the first chamber 13a of the housing facing a wall of the front housing 10. A second area 31b of the PCB second main surface 31 that carries the image sensor 40 is defined within the second chamber 13b of the housing also facing said wall of the front housing 10. On the other hand, a corresponding first area 32a of the PCB first main surface 32 is defined within the first chamber 13a of the housing. A corresponding second area 32b of the PCB first main surface 32 is defined within the second chamber 13b of the housing opposite the image sensor 40.

The lens assembly 51 is sealed in the first opening 50 through any suitable sealing mechanism such as glue or the like. Also, as described above, the interface 80 between the front housing 10 and the back housing 20 is also insulated by a rubber gasket or by any other suitable sealing mechanism. This, together with the provision of the insulating member 70 within the front and back housings 10, 20 defines an insulated camera assembly 1 having therein a highly isolated chamber, i.e., the second chamber 13b, inside of which the image sensor 40 is mounted. As a result, the image sensor 40 fitted therein is fully protected and isolated from dirt, dust and any other foreign matter that otherwise could come into contact with it affecting images displayed.

Figure 8:
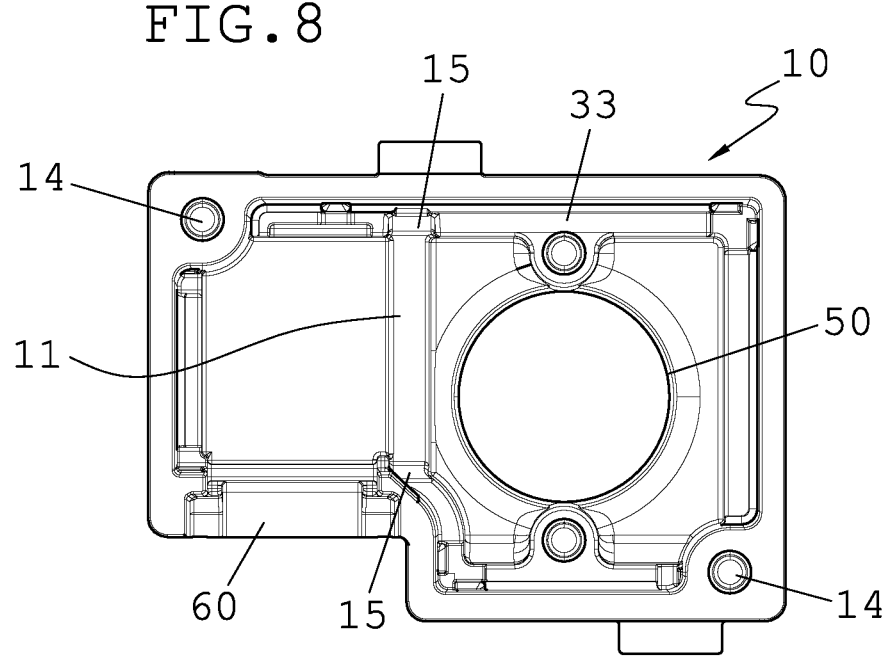
FIG. 8 is a front view of the camera assembly.
Figure 10:
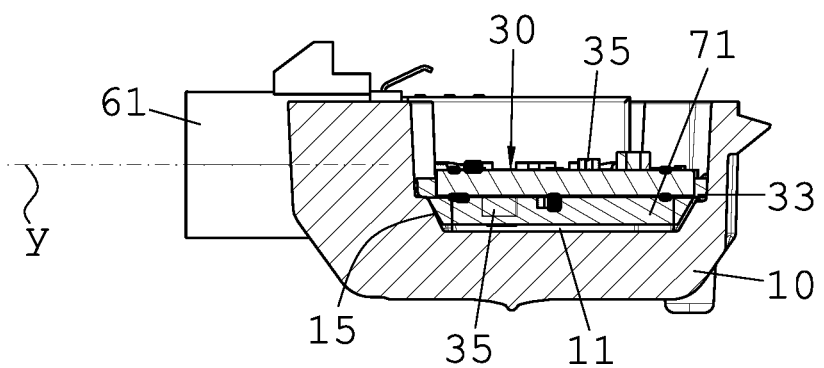
FIG. 10 is a further sectional view of the camera assembly along line F-F in FIG. 6.

The front and back housings 10, 20 have respective inwardly projecting protrusions 11, 12 intended to receive insulating material of the first layer 71 and the second layer 72 of the insulating member 70 in order to provide stability for an efficient deposition of the material of the insulating member 70 in the front and back housings 10, 20. The protrusions 11, 12 are arranged extending perpendicular to the first and second main surfaces 31, 32 of the PCB 30. 45° chamfered ends 15 are defined in the protrusions 11, 12 intended to abut inner walls of the front and back housings 10, 20. Other inclinations for the ends 15 of the protrusions 11, 12 are envisaged such as 30-60°. One of such chamfered ends 15 defined in the protrusion 11 to abut an inner wall of the front housing 10 is shown in FIGS. 8 and 10. Protrusions 11, 12 also allow the area of the first layer 71 and the second layer 72 of the insulating member 70 to be reduced.

As shown in FIGS. 8 and 10 of the drawings, PCB supporting elements 33 are provided in inner side or perimetric walls of the front and back housings 10, 20 for supporting the PCB 30. The chamfered ends 15 extend from a position located below the PCB supporting elements 33 so as to avoid contact with the PCB 30. In use, that is, with the front and back housings 10, 20 attached to each other, the chamfered ends 15 cause the first and second layers 71, 72 of the insulating member 70 to surround and wrap crosswise the PCB 30 and the electronic components 35. In use, the PCB supporting elements 33 of the front housing may contact the first main flat surface 32 of the PCB 30. Further, the PCB supporting elements 33 of the back housing may contact the second main flat surface 31 of the PCB 30.

Figure 14:
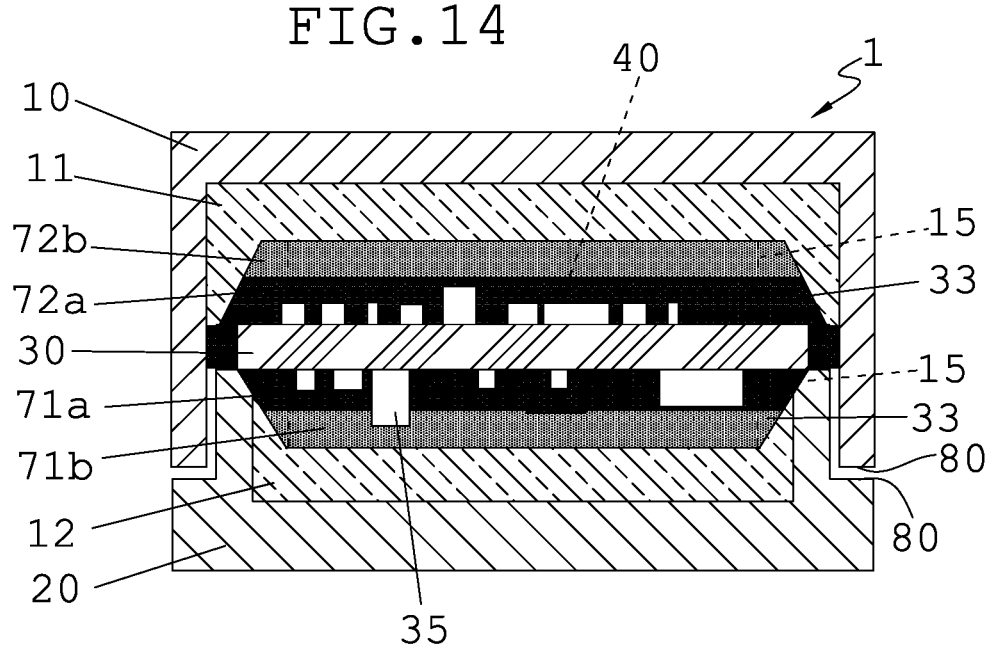
FIG. 14 is a diagrammatic sectional view of the front and back housings taken along line D-D in FIG. 7 in an assembled condition.

For assembling the camera assembly 1 described above, a robot deposits a paste-like gap filler or other suitable insulating material to define a first layer 71 of gap filler in the front housing 10 and a second layer 72 of gap filler in the back housing 20 so as to define an insulating member 70 that divides the interior of the front and back housings 10, 20 into two chambers 13a, 13b. This may be carried out applying insulating material in one or more passes 71a, 71b for the first layer 71 and one or more passes 72a, 72b for the second layer 72 of the insulating member 70 as shown in FIGS. 13a, 13b and 14.

As shown in figure, a PCB 30 with an image sensor or imager 40 connected thereto is then attached in the front housing 10 via screws such that the image sensor 40 is optically connected to lens assembly 51. As shown in FIG. 13b, when the screws are tightened so that the first main flat surface 32 of the PCB 30 contacts the PCB supporting elements 33 until it is seated thereon with the PCB 30 contacting the first layer 71 of the insulating member 70 which becomes deformed. The second main flat surface 31 of the PCB 30 then contacts the PCB supporting elements 33 until it is seated thereon. The first layer 71 of the insulating member 70 is pressed both by the PCB 30 and the protrusion 11 in the front housing 10. The PCB 30 is thus positioned perpendicular to the insulating member 70 dividing each chamber 13a, 13b into two sub-chambers as shown in FIG. 14. As a result, the above mentioned four quadrants Q1, Q2, Q3, Q4 are defined within the front and back housings 10, 20 by the insulating member 70 and the PCB 30.

The lens assembly 51 is then placed on a lens barrel defined in the first opening 50 formed in the front housing 10 and attached therein by UV cured glue or screwed. A rubber gasket may be preferably provided in the interface 80 of the front housing 10 and the back housing 20. The back housing 20 is then attached to the front housing 10 via screws 14 such that the back housing 20 is aligned with the front housing 10 as a result of which the image sensor 40 is also aligned with the lens assembly 51. The second layer 72 is thus pressed by the back housing 20 and the PCB 30 and becomes deformed contacting the first main flat surface 32 of the PCB 30 and also an upper portion of the electrical components 35 of the PCB 30 leaving no gaps.

A barrier is formed by the insulating member 70 that prevents dust and/or dirt and other foreign matter in the first chamber 13a from passing to the second chamber 13b and reaching the image sensor 40.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

What is claimed is:

1. A camera assembly for a motor vehicle, the camera assembly comprising:
    a housing having at least one opening for receiving a connector-adapter, wherein the housing comprises a first housing part and a second housing part;
    an image sensor being attached to an electronics carrier that is provided within the housing; and
    an insulating member fitted within the housing defining therein at least a first chamber and a second chamber, the insulating member being arranged such that the electronics carrier is intersected by the insulating member preventing matter from passing from the first chamber to the second chamber,
    wherein the electronics carrier is positioned such that at least one opening for receiving the connector-adapter is in the first chamber and the image sensor is positioned in the second chamber,
    wherein the insulating member fits, surrounds, and wraps a cross sectional portion of the electronics carrier leaving no gaps between the insulating member and the electronics carrier; and
    wherein the insulating member includes a first layer positioned in the first housing part and a second layer positioned in the second housing part that is different from the first layer, wherein, in use, the electronics carrier is sandwiched between the first layer and the second layer.

2. The camera assembly of claim 1, wherein the insulating member is arranged to contact inner walls of the housing and the electronics carrier.

3. The camera assembly of claim 1, wherein a distance (L) between oppositely facing surfaces of the first layer and the second layer of the insulating member is equal to or less than a thickness (t) of the electronics carrier.

4. The camera assembly of claim 1, wherein the housing includes at least one protrusion extending towards the electronics carrier to support the first and second layers of the insulating member.

5. The camera assembly of claim 1, wherein the insulating member is arranged perpendicular to the electronics carrier.

6. The camera assembly of claim 1, wherein the insulating member is made of one of a non-electrically conductive material having a thermal conductivity of 1-15 W/mK or a material including properties that are stable at a temperature ranging from −40 C° to 150 C°.

7. The camera assembly of claim 1, wherein the at least one opening in the housing is arranged for receiving a connector-adapter such that a longitudinal axis (y) of the connector-adapter is substantially perpendicular to an optical axis (x) of a lens assembly.

8. A method for assembling the camera assembly of claim 1 comprising depositing insulating material within a housing to form an insulating member and fitting of the electronics carrier inside the housing such that the electronics carrier is intersected by the insulating member.

9. A camera assembly for a motor vehicle, the camera assembly comprising:
    a housing having at least one opening for receiving a connector-adapter, wherein the housing comprises a first housing part and a second housing part;
    an image sensor being attached to an electronics carrier that is provided within the housing; and an insulating member positioned within the housing defining therein at least a first chamber and a second chamber, wherein the insulating member intersects with the electronics carrier to prevent matter from passing from the first chamber to the second chamber, wherein the electronics carrier is positioned such that the at least one opening for receiving the connector-adapter is in the first chamber and the image sensor is positioned in the second chamber, wherein the insulating member fits, surrounds, and wraps a cross sectional portion of the electronics carrier leaving no gaps between the insulating member and the electronics carrier, and wherein the insulating member includes a first layer positioned in the first housing part and a second layer positioned in the second housing part that is different from the first layer, wherein, in use, the electronics carrier is sandwiched between the first layer and the second layer.

10. The camera assembly of claim 9, wherein a portion of the electronics carrier located in the first chamber is electrically connected to a portion of the electronics carrier located in the second chamber.

11. The camera assembly of claim 1, wherein the first chamber is completely sealed from the second chamber to prevent the matter from passing from the first chamber to the second chamber.

12. A camera assembly for a motor vehicle, the camera assembly comprising:

a housing having at least one opening for receiving a connector-adapter and for enabling the connector-adapter to extend outwardly away from the housing, wherein the housing comprises a first housing part and a second housing part;

an image sensor being attached to an electronics carrier that is provided within the housing; and an insulating member positioned within the housing defining therein at least a first chamber and a second chamber, wherein the first chamber receives matter from outside of the camera assembly through the at least one opening for receiving the connector-adapter, wherein the insulating member intersects with the electronics carrier to prevent matter from passing from the first chamber to the second chamber, wherein the at least one opening for receiving the connector-adapter is in the first chamber and the image sensor is positioned in the second chamber, wherein the insulating member fits, surrounds, and wraps a cross sectional portion of the electronics carrier leaving no gaps between the insulating member and the electronics carrier, and wherein the insulating member includes a first layer positioned in the first housing part and a second layer positioned in the second housing part that is different from the first layer, wherein, in use, the electronics carrier is sandwiched between the first layer and the second layer.

13. The camera assembly of claim 1, wherein:
the electronics carrier includes a first side, a second side, and an edge;
the edge connects the first side and the second side;
the first side is opposite to the second side;
a first inner side of the insulating member abuts the first side of the electronics carrier; and
a second inner side of the insulating member abuts the second side of the electronics carrier.

14. The camera assembly of claim 1, wherein the first layer is arranged to contact an inner wall of the first housing part and a first side of the electronics carrier, wherein the second layer is arranged to contact an inner wall of the second housing part and a second side of the electronics carrier, and wherein at least one of the first layer and the second layer is arranged to contact an edge of the electronics carrier.

15. The camera assembly of claim 1, wherein an entirety of the electronics carrier as positioned in the second chamber is completely free of the insulating member.

16. The camera assembly of claim 1, wherein the at least one opening that receives the connector-adaptor enables the matter to pass into the first chamber.

* * * * *